(12) United States Patent
Zhu et al.

(10) Patent No.: US 7,176,977 B2
(45) Date of Patent: Feb. 13, 2007

(54) FRAME RATE CONVERSION OF INTERLACED AND PROGRESSIVE VIDEO STREAMS

(75) Inventors: Ge Zhu, Shanghai (CN); Qing Yang, Shanghai (CN)

(73) Assignee: Huaya Microelectronics, Ltd., San Jose, CA (US)

(*) Notice: Subject to any disclaimer, the term of this patent is extended or adjusted under 35 U.S.C. 154(b) by 530 days.

(21) Appl. No.: 10/659,041

(22) Filed: Sep. 9, 2003

(65) Prior Publication Data

US 2004/0201777 A1    Oct. 14, 2004

(51) Int. Cl.
*H04N 7/01* (2006.01)
(52) U.S. Cl. .................. 348/448; 348/449; 348/558
(58) Field of Classification Search ........ 348/448–452, 348/441, 445, 446, 554–558
See application file for complete search history.

(56) References Cited

U.S. PATENT DOCUMENTS

| 4,881,125 A | * | 11/1989 | Krause ........................ 348/448 |
| 6,700,622 B2 | * | 3/2004 | Adams et al. .............. 348/448 |
| 6,870,568 B1 | * | 3/2005 | Hui ............................ 348/458 |

* cited by examiner

*Primary Examiner*—Michael H. Lee
(74) *Attorney, Agent, or Firm*—Silicon Valley Patent Group; Edward S. Mao

(57) ABSTRACT

A method and system for deinterlacing an interlaced video stream is presented. The method and system determines whether an interlaced video stream is a normal mode video stream or a special mode video stream. Special mode video streams, which interlaced video streams created from a progressive original video stream, are deinterlaced using special mode deinterlacing, which involves merging two fields to form a frame. Normal mode video streams are deinterlaced using normal mode deinterlacing, which involves converting a field into a frame using line repeating or some form of interpolation to generate the missing scan lines.

44 Claims, 7 Drawing Sheets

FRAME RATE CONVERSION OF INTERLACED AND PROGRESSIVE VIDEO STREAMS

BACKGROUND OF THE INVENTION

1. Field of the Invention

The present invention relates to digital image and video processing. More specifically, the present invention relates to methods of converting frame rates for interlaced and progressive (i.e., non-interlaced) video streams.

2. Discussion of Related Art

Due to advancing semiconductor processing technology, integrated circuits (ICs) have greatly increased in functionality and complexity. With increasing processing and memory capabilities, many formerly analog tasks are being performed digitally. For example, images, audio and even full motion video can now be produced, distributed, and used in digital formats.

FIG. 1 is an illustrative diagram of a portion of interlaced digital video stream 100 most often used in television systems. Interlaced digital video stream 100 comprises a series of individual fields 100_1 to 100_N, of which the first ten fields are shown. Even fields contain even numbered rows while odd fields contain odd numbered rows. For example if a frame has 400 rows of 640 pixels, the even field would contains rows 2, 4, . . . 400 and the odd field would contains rows 1, 3, 5, . . . 399 of the frame. In general for an interlaced video stream each field is formed at a different time. For example, an interlaced video capture device (e.g. a video camera) captures and stores the odd scan lines of a scene at time T as field 100_1, then the video capture device stores the even scan lines of a scene at time T+1 as field 100_2. The process continues for each field.

Interlaced video systems were designed when bandwidth limitations precluded progressive (i.e., non-interlaced) video systems with adequate frame rates. Specifically, interlacing two 30 fps fields achieved an effective 60 frame per second frame rate because the phosphors used in television sets would remain "lit" while the second field is drawn. Progressive video streams use complete frames, including both the even and odd scan lines instead of fields. Because progressive scan provides better display quality, computer systems, which were developed much later than the original television systems, use progressive scan display systems. Furthermore, many modern televisions and television equipment are being developed to use progressive video streams. To maintain compatibility with existing interlaced video systems, modern progressive systems use deinterlacing techniques to convert interlaced video streams into progressive video streams.

FIG. 2(a) and 2(b) illustrate a typical method of generating a progressive video stream 200 from an interlaced video stream 100. Specifically each field 100_X of interlaced video stream 100 is converted to a frame 200_X of progressive video stream 200. The conversion of a field to a frame is accomplished by generating the missing scan lines in each frame by copying or interpolating from the scan lines in the field. For example, as illustrated in FIG. 2(b) field 100_1 having odd scan lines 100_1_1, 100_1_3, 100_1_5, . . . 100_1_N, is converted into a frame 200_1 by copying scan lines 100_1_X as odd scan lines 200_1_X, where X is an odd number and creating even scan lines 200_1_Y, where Y is an even number. Even scan lines 200_1_Y can be created by copying the preceding odd scan line 200_1_Y−1. This technique is commonly known as line repeat. Better results can be obtained using various interpolation schemes to generate the missing scan lines. For example, one interpolation scheme simply averages odd scan line 200_1_Y−1 with odd scan line 200_1_Y+1 to generate even scan line 200_1_Y. Other interpolation schemes may use weighted averages or other more complicated ways to combine data from the existing scan lines to generate the missing scan lines. Another normal mode deinterlacing technique known as 3D deinterlacing involves generating the missing scan lines by interpolating the missing pixels using data from adjacent fields. Conversion of fields into frames is not an integral part of the present invention. The principles of the present invention can easily be adapted to use any form of field to frame conversion.

However, many types of video streams are captured at different frame rates. For example, conventional motion pictures are captured and displayed using 24 frames per seconds. To display motion pictures on an NTSC (interlaced 60 fields/second) display, a frame rate conversion process that transforms four frames of a motion picture into ten fields is applied to the motion picture video stream. FIG. 3 illustrates this process. Specifically, FIG. 3 shows the first four frames M_01 to M_04 of a motion picture video stream MPVS being converted to 10 fields of an interlaced video stream 300. Field 300_1 and field 300_3 include the odd scan lines of frame M_01. Field 300_2 includes the even scan lines of frame M_01. Field 300_4 includes the even scan lines of frame M_02 and Field 300_5 includes the odd scan lines of frame M_02. Field 300_6 and field 300_8 include the even scan lines of frame M_03. Field 300_7 includes the odd scan lines of frame M_03. Field 300_9 includes the odd scan lines of frame M_04 and field 300_10 includes the even scan lines of frame M_04. For clarity, portions of interlaced video streams formed using frame rate conversion are referred said to be in "special mode." Table 1 summarizes the relationship of the fields of interlaced video stream 300 and the frames of motion picture video stream MPVS.

TABLE 1

| Field | Content |
| --- | --- |
| 300_1 | ODD scan lines of MP_01 |
| 300_2 | EVEN scan lines of MP_01 |
| 300_3 | ODD scan lines of MP_01 |
| 300_4 | EVEN scan lines of MP_02 |
| 300_5 | ODD scan lines of MP_02 |
| 300_6 | EVEN scan lines of MP_03 |
| 300_7 | ODD scan lines of MP_03 |
| 300_8 | EVEN scan lines of MP_03 |
| 300_9 | ODD scan lines of MP_04 |
| 300_10 | EVEN scan lines of MP_04 |

While displaying interlaced video stream 300 on interlaced video systems provide adequate picture quality. Conventional deinterlacing techniques as described above and illustrated in FIGS. 2(a) and 2(b) can be used by a progressive scan display system to view interlaced video stream 300. However, the picture quality of a de-interlaced video stream formed from interlaced video stream 300 is much lower than the picture quality of the original progressive video stream that was used to create interlaced video stream 300.

Hence, there is a need for a deinterlacing method or system that can determine whether a given interlaced video stream is in normal mode (e.g. like a normal television signal) or in a special mode (e.g. formed from a frame rate conversion process). The method or system must then deinterlace the given interlaced video stream appropriately.

SUMMARY

Accordingly, the present invention provides a method and system for deinterlacing an interlaced video stream that determines whether an interlaced video stream is a normal mode video stream or a special mode video stream. Special mode video streams are deinterlaced using special mode deinterlacing, which involves merging two fields to form a frame. Normal mode video streams are deinterlaced using normal mode deinterlacing, which involves converting a field into a frame using line repeating or some form of interpolation to generate the missing scan lines.

Specifically, in one embodiment of the present invention, a deinterlacer includes a buffer for storing fields of the input interlaced video stream, a mode detector for determining whether the input interlaced video stream is a special mode video stream or a normal mode video stream, and a field merging and conversion unit to perform either normal mode deinterlacing or special mode deinterlacing on the input interlaced video stream to create an output progressive video stream. Within the mode detector, a field difference calculation unit calculates field to field differences between each field and the second field following that field. The field to field differences are stored in a field to field difference FIFO. A special pattern detector determines whether the field to field differences in the field to field difference FIFO matches a special pattern which indicates that the input interlaced video stream might be a special mode video. In general, if the selected special pattern is detected a special mode threshold times the mode detector determines that the input interlaced video stream is a special mode video stream and controls the field merging and conversion unit so that special mode deinterlacing is performed.

The present invention will be more fully understood in view of the following description and drawings.

DETAILED DESCRIPTION

As explained above, interlaced video streams can be in normal mode or special mode. Many interlaced video streams may also switch back and forth between normal mode and special mode. To use interlaced video streams on progressive video systems, a deinterlacing system is used to convert the interlaced video stream into a de-interlaced video stream. However, different deinterlacing techniques are used depending on whether the incoming interlaced video stream is in special mode or normal mode.

Figure 1:
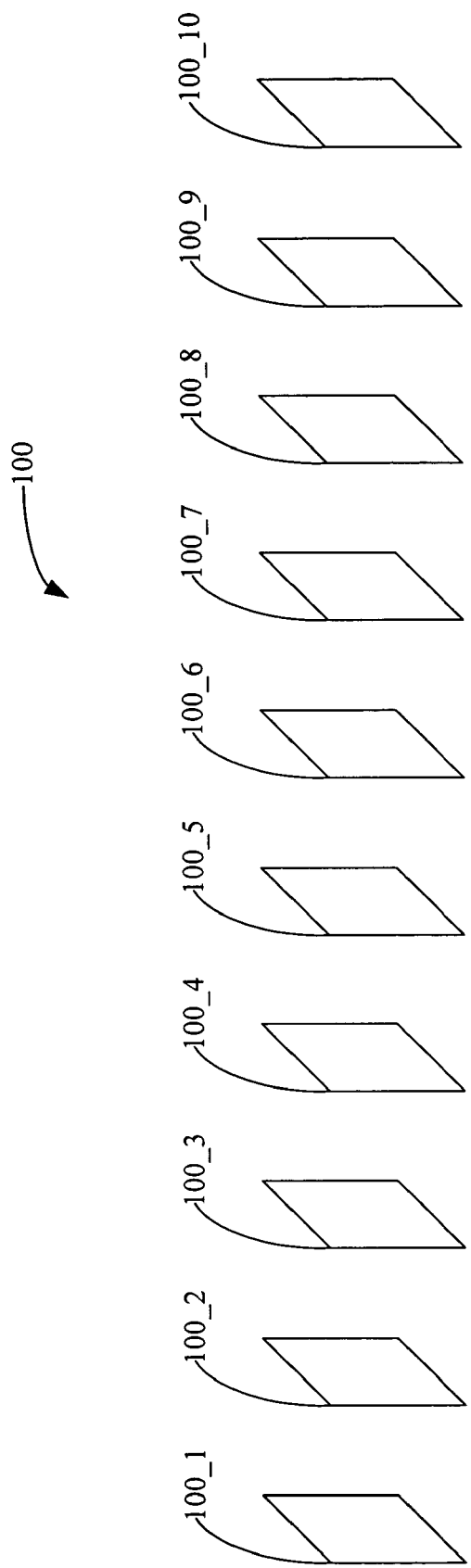
FIG. 1 is an illustration of an interlaced video stream.
Figure 2A:
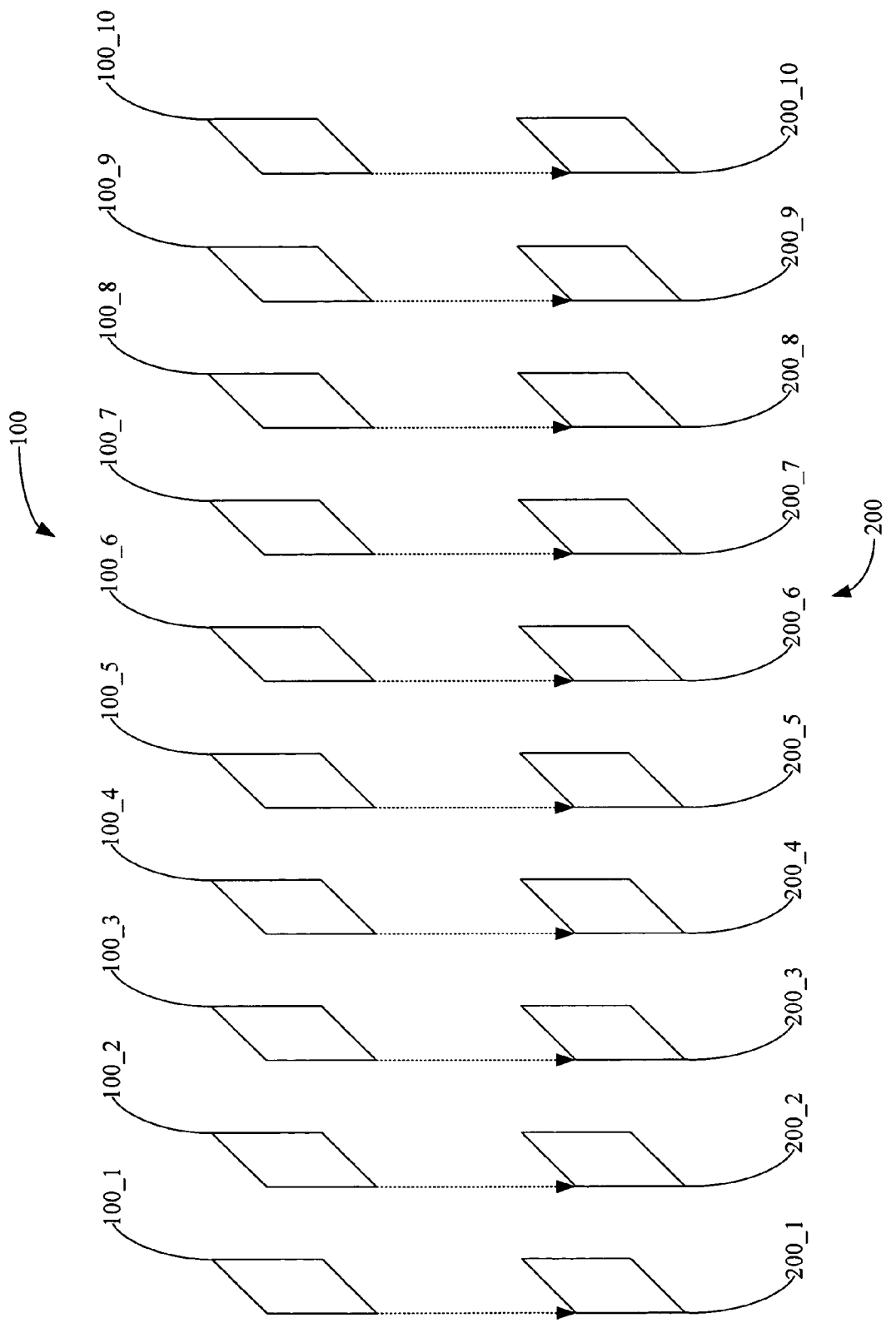
FIGS. 2(a) and 2(b) illustrate a deinterlacing process to form a de-interlaced video stream.
Figure 2B:
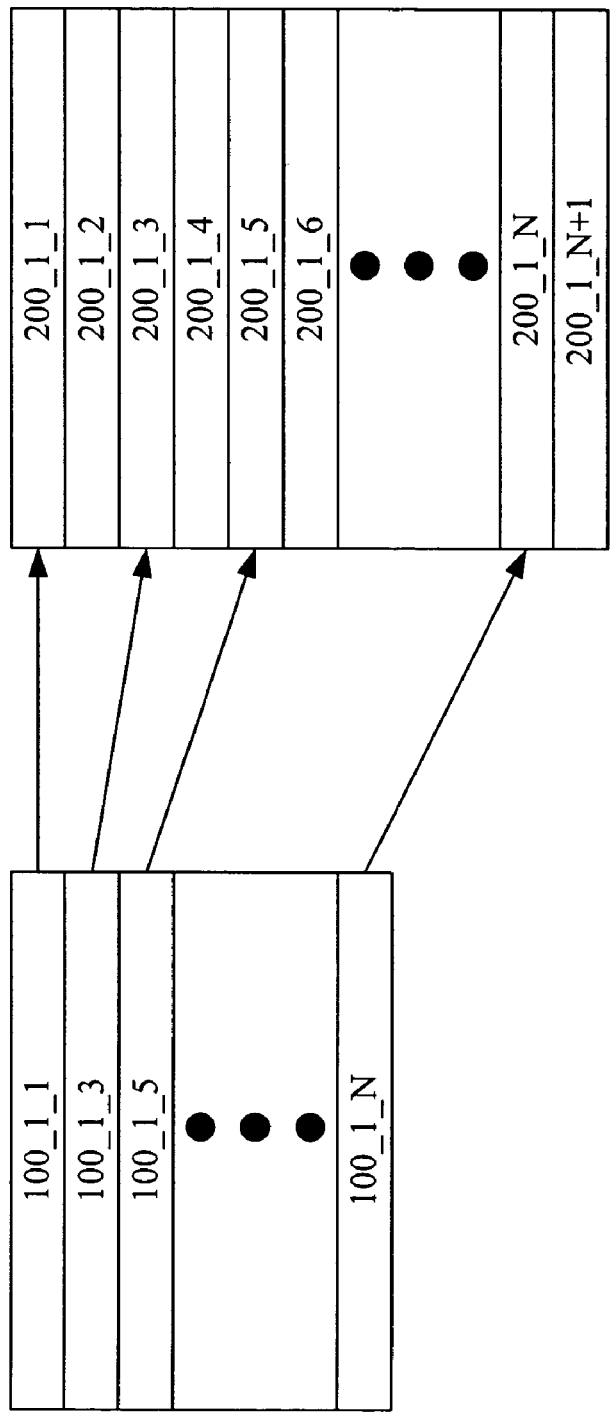
Figure 3:
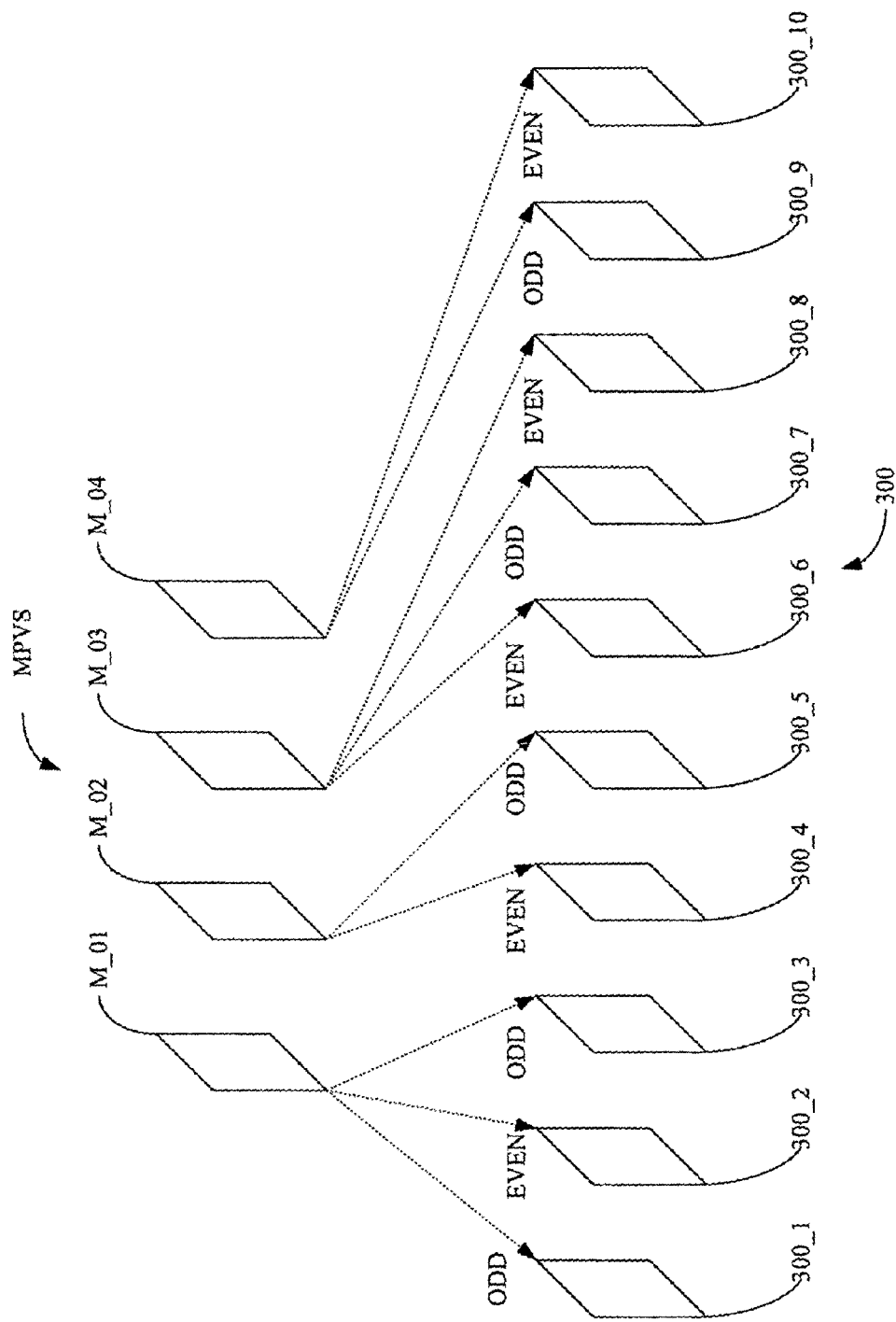
FIG. 3 illustrates a frame rate conversion process used to form an interlaced video stream from a motion picture video stream for NTSC 60 fields/s display devices.
Figure 4:
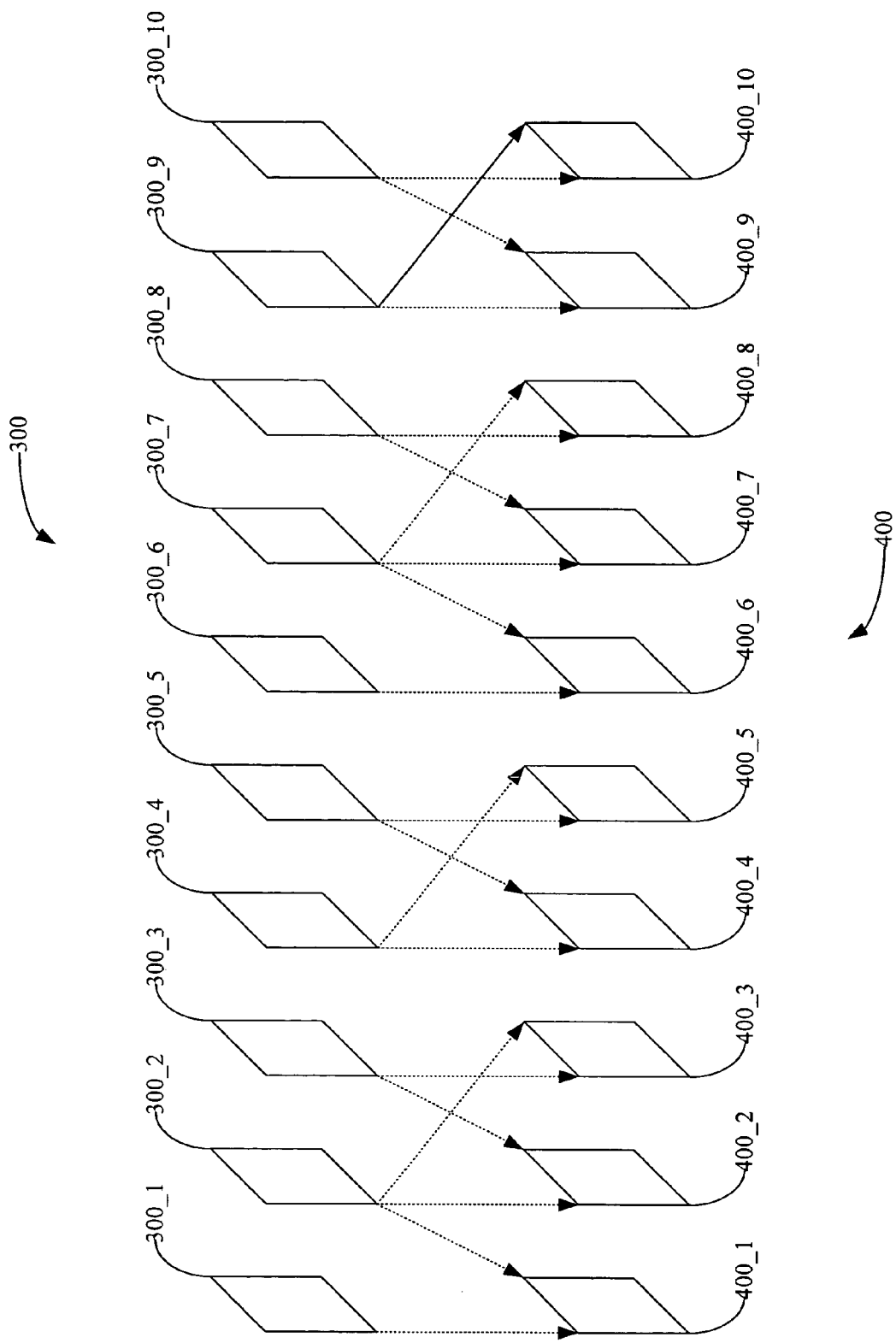
FIG. 4 illustrates a deinterlacing process to form a de-interlaced video stream from an interlaced video stream formed from a frame rate conversion process.

FIG. 4 illustrates a method of generating a progressive video stream 400 from interlaced video stream 300, which is in the special mode because it was formed using the frame rate conversion process described above from motion picture video stream MPVS (FIG. 3). Rather than simply converting a field into a frame, embodiments of the present invention merge two fields of a special mode video stream into a frame. For example, frame 400_1 is formed by merging fields 300_1, which includes the odd scan lines of frame $MP_{13}$ 01 (FIG. 3), and field 300_2, which includes the even scan lines of frame MP_01. Frame 400_2 is formed by merging field 300_2, which includes the even scan lines of frame MP_01, and field 300_3, which includes the odd scan lines of frame MP_01. Alternatively, some embodiments of the present invention may use form Frame 400_2 by merging field 300_2 with field 300_1. Frame 400_3 is formed by merging field 300_3, which includes the odd scan lines of frame $MP_{13}$ 01, and field 300_2, which includes the even scan lines of frame MP_01.

Frame 400_4 is formed by merging field 300_4, which includes the even scan lines of frame MP_02, and field 300_5, which includes the odd scan lines of frame MP_02. Frame 400_5 is formed by merging field 300_5, which includes the odd scan lines of frame MP_02, and field 300_4, which includes the even scan lines of frame MP_02.

Frame 400_6 is formed by merging field 300_6, which includes the even scan lines of frame MP_03, and field 300_7, which includes the odd scan lines of frame MP_03. Frame 400_7 is formed by merging field 300_7, which includes the odd scan lines of frame MP_03, and field 300_8, which includes the even scan lines of frame MP_03. Frame 400_8 is formed by merging field 300_8, which includes the even scan lines of frame MP_03, and field 300_7, which includes the odd scan lines of frame MP_03.

Frame 400_9 is formed by merging field 300_9, which includes the odd scan lines of frame MP_04, and field 300_10, which includes the even scan lines of frame MP_04. Frame 400_10 is formed by merging field 300_10, which includes the even scan lines of frame $MP_{04}$, and field 300_9, which includes the odd scan lines of frame MP_04. Table 2 summarizes the frames of progressive video stream 400.

TABLE 2

| Frame | Content |
| --- | --- |
| 400_1 | ALL scan lines of MP_01 |
| 400_2 | ALL scan lines of MP_01 |
| 400_3 | ALL scan lines of MP_01 |
| 400_4 | ALL scan lines of MP_02 |
| 400_5 | ALL scan lines of MP_02 |
| 400_6 | ALL scan lines of MP_03 |
| 400_7 | ALL scan lines of MP_03 |
| 400_8 | ALL scan lines of MP_03 |
| 400_9 | ALL scan lines of MP_04 |
| 400_10 | ALL scan lines of MP_04 |

The present invention detects video streams in the special mode by calculating the field to field differences between each field X and field X+2, i.e. the second field following field X. In general, field to field difference between a first field and a second field is calculated by summing the absolute value of the difference between each pixel in a first field with the corresponding pixel of the second field. However, some embodiments of the present invention use a pixel difference threshold T_PIX_DIFF in the field to field difference calculation. Specifically, if the absolute value of the difference between a pixel in the first field and the corresponding pixel in the second field is less than pixel difference threshold T_PIX_DIFF, then the field to field difference would not include the absolute value of differences. In other words, only absolute value of differences that are greater than pixel difference threshold T_PIX_DIFF are included in the field to field difference.

Some embodiments of the present invention may count the number of different corresponding pixels as a proxy for the field to field difference. Specifically, if a the absolute value of the difference between a pixel in the first field and the corresponding pixel in the second field is greater than pixel difference threshold T_PIX_DIFF, then the pixels are considered to be different. The field to field difference be defined as the number of different pixels. For clarity, approximations and proxies of the actual field to field difference are hereinafter encompassed in the term field to field difference.

Some embodiments of the present invention may use only a subset of the pixels in the first field with the corresponding pixels of the second field rather than every pixel of the first field. A field to field difference calculated using a subset of pixels may be less accurate but can be computed more quickly.

A deinterlacing system in accordance with the principles of one embodiment of the present invention would calculate a field to field difference between field 300_1 (FIG. 3) and field 300_3, between field 300_2 and field 300_4, and in general between field 300_X and field 300_(X+2). As illustrated in FIG. 3, fields 300_1 and 300_3 of interlaced video stream 300, which is a special mode video stream, would be very similar because field 300_1 and field 300_3 are formed from the odd scan lines of motion picture frame M_01 (noise issues are likely to prevent a perfect match). Thus the field to field difference between field 300_1 and 300_3 would be very small. Similarly, field 300_6 and field 300_8 would also be very similar because field 300_6 and field 300_8 are formed from the even scan lines of motion picture frame M_03. Thus, the field to field difference between fields 300_6 and 300_8 would also be very small.

However, field 300_2 and field 300_4 are generally not very similar because field 300_2 is formed from the even lines of motion picture frame M_01 and field 300_4 is formed from the even lines of motion picture frame M_02. Thus, the field to field difference between field 300_2 and field 300_4 would be large relative to the field to field difference between fields 300_1 and 300_3. Similarly, the field to field difference of between field 300_3 and field 300_5 would likewise be large because field 300_3 is formed from the odd lines of motion picture frame M_01 and field 300_5 is formed from the odd lines motion picture frame M_02. However, if the video stream contains a very still scene (i.e. the scene does not change and there are no moving objects in the scene) the field to field differences between any pair of successive odd fields or successive even fields would be very small. In these situations, detection of the selected special pattern may not be possible. Table 3 provides expected relative values of field to field differences for the 11 fields of interlaced video stream 300.

TABLE 3

| Field | Field | Field to Field Difference |
|---|---|---|
| 300_1 | 300_3 | SMALL |
| 300_2 | 300_4 | LARGE |
| 300_3 | 300_5 | LARGE |
| 300_4 | 300_6 | LARGE |
| 300_5 | 300_7 | LARGE |
| 300_6 | 300_8 | SMALL |
| 300_7 | 300_9 | LARGE |
| 300_8 | 300_10 | LARGE |

TABLE 3-continued

| Field | Field | Field to Field Difference |
|---|---|---|
| 300_9 | 300_11 | LARGE |
| 300_10 | 300_12 | LARGE |
| 300_11 | 300_13 | SMALL |

Thus, for special mode interlaced video streams, one or more special pattern in the field to field differences can be detected. Detection of special patterns is usually based on determining whether the field to field differences that are suppose to be small are indeed smaller than all the field to field differences that are suppose to be large.

For the case of a 24 frame per second progressive video stream converted to a 60 field per second interlaced video stream to be shown on an NTSC video device, one special pattern is "SLLLL", i.e. a small field to field difference followed by 4 large field to field differences. Another special pattern could be defined as "LLLLSLLLL", i.e. four large field to field differences, followed by a small field to field difference, followed by four large field to filed differences. Additional special patterns could be defined. For example other special patterns could be "SLLLLSLLLLSLLLLSLLLLS", "LLLLSLLLLSLLLLSLLLL". In general larger special patterns would result in more accurate detection of special mode video streams but may require more resources to detect.

Furthermore, the field corresponding to the SMALL field to field difference can be used to exactly pinpoint which fields should be merged in special mode deinterlacing as described above. Normal mode video streams would not exhibit these special patterns because a field and the second following field in a normal mode video stream are formed from separate frames. Thus, field to field differences for normal video streams would likely result in random relative field to field patterns.

By calculating field to field differences and detecting one special pattern in the field to field differences, deinterlacing systems in accordance with embodiments of the present invention can detect whether a video stream is a special mode video streams or a normal mode video stream. In most embodiments of the present invention, one special mode pattern is selected for detection. For clarity, "selected special mode pattern" is used herein to indicate the special pattern out of the all the possible special pattern that is being used for detection of video streams in special mode.

Video streams in special mode are deinterlaced by merging appropriate fields to form frames, which is also referred to herein as special mode deinterlacing. Video stream in normal mode are deinterlaced by converting fields to frames without merging of two fields, which is also referred to herein as normal mode deinterlacing.

Generally, embodiments of the present invention also include thresholds to determine when to switch from normal mode deinterlacing to special mode deinterlacing and when to switch from special mode deinterlacing to normal mode deinterlacing depending on the number of times the special pattern of field to field differences are detected. For example, one embodiment of the present invention a transition from normal mode to special mode occurs only if the special pattern is detected an enter special mode threshold T_S_ENTER number of times. If enter special mode threshold T_S_ENTER is equal to 5, a deinterlacing system would switch from normal mode deinterlacing to special mode deinterlacing only after detecting five consecutive occurrences of a specific special pattern. Conversely, transition from special mode deinterlacing to normal mode deinterlacing occurs if the specific special pattern is not detected for an exit special mode threshold T_S_EXIT number of fields. If exit special mode threshold T_S_EXIT is equal to 25, a deinterlacing system would switch from special mode to normal mode after not detecting the special pattern in 25 consecutive fields. Many embodiments of the present invention allow a user to define enter special mode threshold T_S_ENTER and exit special mode threshold T_S_EXIT. Enter special mode threshold T_S_ENTER can be any positive integer, however most embodiments of the present invention limit enter special mode threshold T_S_ENTER in the range of 3 to 10, inclusive. In one embodiment of the present invention, enter special mode threshold T_S_ENTER has a default value of 5. Exit special mode threshold T_S_EXIT can be any size greater than or equal to the size of the selected special pattern, however most embodiments of the present invention limit exit special mode threshold T_S_EXIT in the range of 14 to 50 inclusive. In one embodiment of the present invention, exit special threshold T_S_EXIT has a default value of 19 using a selected special pattern having a size of 9.

Some embodiments of the present invention may also detect errors in special mode video streams. Errors can occur for example due to missing fields or extra fields in the special mode interlaced video streams. In one embodiment of the present invention, errors in special mode video streams are detected by determining whether the incoming field to field difference would follow the special pattern. If the incoming field to field difference follows the special pattern then special mode deinterlacing is applied to the current field. However, if the incoming field to field difference does not follow the special pattern, special mode deinterlacing is temporarily suspended and normal mode deinterlacing is used. The temporary suspension is lifted as soon as an occurrence of the selected special pattern is detected. The benefit of temporarily suspending special mode is to avoid mismerged frames (i.e. merging two fields that are not the odd and even fields of a single frame). In general properly merged frames provide higher picture quality than frames created using normal mode deinterlacing. Frames created using normal mode deinterlacing provide higher picture quality than mismerged frames. Thus, avoiding mismerged frames increases the overall picture quality of the deinterlaced video stream. Furthermore, by only temporarily suspending special mode deinterlacing rather than ending special mode deinterlacing when an error is detected, a higher number of properly merged frames are produced. Specifically, if special mode deinterlacing is ended, the selected special pattern must be detected special mode threshold T_S_ENTER times before special mode deinterlacing is used. However with temporary suspension of special mode deinterlacing, special mode deinterlacing is used as soon as the selected special pattern is detected.

Figure 5:
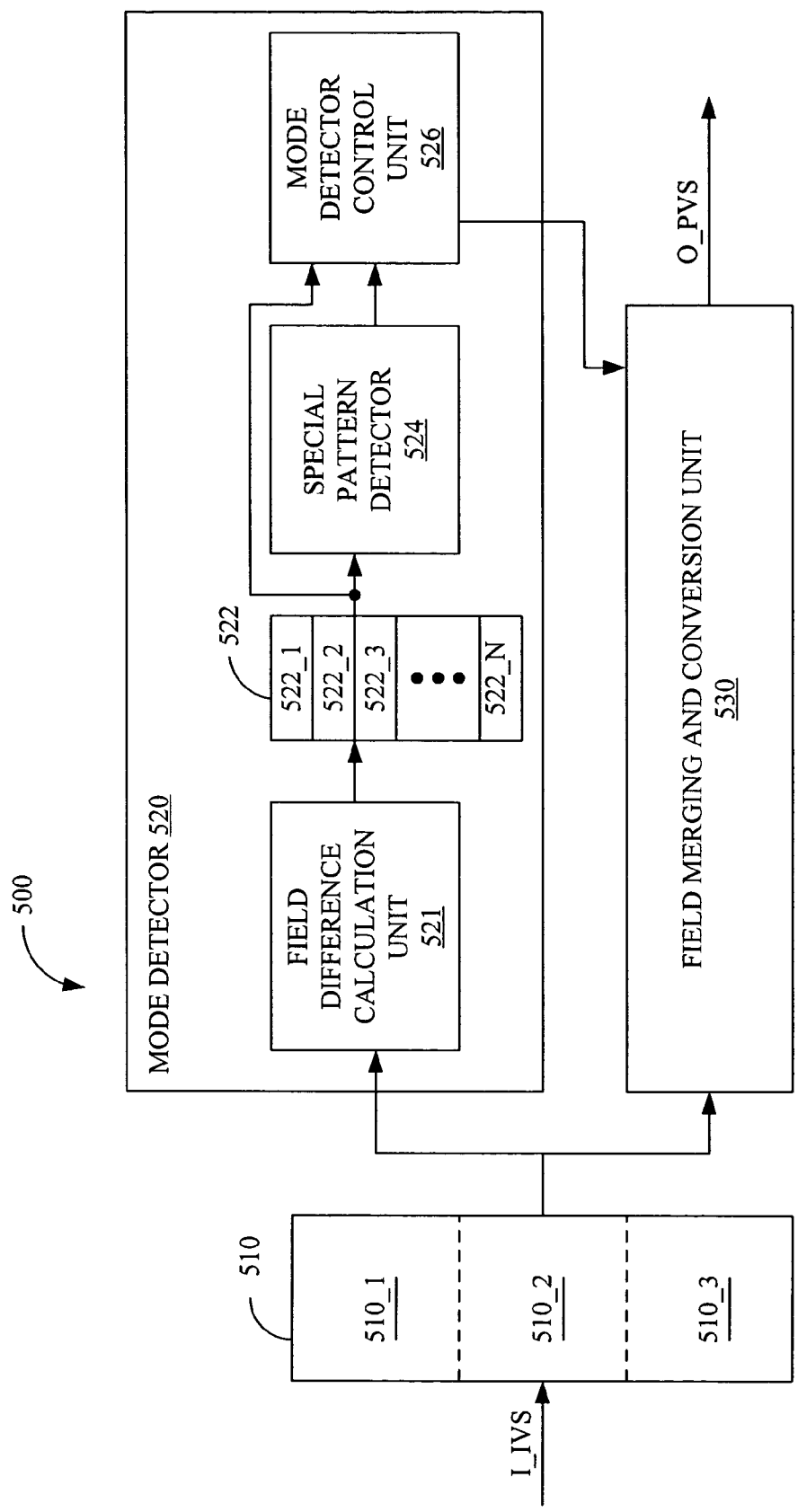
FIG. 5 is a simplified block diagram of a deinterlacing system in accordance with one embodiment of the present invention.

FIG. 5 is a simplified block diagram of a deinterlacing system 500, which receives an input interlaced video stream I_IVS and generates an output progressive video stream O_PVS in accordance with one embodiment of the present invention. Deinterlacing system 500 includes a buffer 510, a mode detector 520, and a field merging and conversion unit 530. In the embodiment of FIG. 5, buffer 510 has three field buffers 510_1, 510_2, and 510_3. Buffer 510 is used as a circular buffer so that the first field of input interlaced video stream I_IVS is written into field buffer 510_1, the second fields of input interlaced video stream I_IVS is written into field buffer 510_2, the third field of input interlaced video stream I_IVS is written into field buffer 510_3. Then the fourth field of input interlaced video stream I_IVS is written into field buffer 510_1, the fifth field of input interlaced video stream I_IVS is written into field buffer 510_2, and the sixth field of input interlaced video stream I_IVS is written into field buffer 510_3. This process continues for all the fields of input interlaced video stream I_IVS.

Thus, in general buffer 510 contains three fields from input interlaced video stream I_IVS. Deinterlacing system 500 generally uses an early field pointer EFP to track which field buffer contains the earliest field, a current field pointer CFP to track which field buffer contains the current field, and a late field pointer LFP to track which field buffer contains the latest field. Thus initially, early field pointer EFP would point to field buffer 510_1, current field pointer CFP would point to field buffer 510_2, and late field pointer LFP would point to field buffer 510_3. However, as deinterlacing system 500 receives new fields from input interlaced video stream I_IVS, early field pointer EFP, current field pointer CFP, and late field pointer LFP would be incremented by 1 using modulo 3 addition. (i.e. incremented by 1 but also reset to 0 if the pointer is equal to 3 after being incremented). Specifically, if early field pointer EFP is pointing to field buffer 510_X, after a new field is read into buffer 510, early field pointer EFP would point to field buffer 510_((X+1) MOD 3). For convenience, the field in the buffer pointed to by early field pointer EFP is called the "early field." Similarly, the field in the buffer pointed to by current field pointer CFP is called the "current field" and the field in the buffer pointed to by late field pointer LFP is called the "late field." Field to field differences (as described above) would be calculated between the early field and the late field. Other embodiments of the present invention may include a larger buffer to store more fields simultaneously.

Mode detector 520 includes a field difference calculation unit 521, a field to field difference (F2FD) FIFO 522, a special pattern detector 524, and a mode detection control unit 526. Field difference calculation unit 521 calculates a field to field difference between the early field and the late field in buffer 510 as each new field is written into buffer 510. The field to field difference is written into F2FD FIFO 522. F2FD FIFO 522 includes N data words 522_1 to 522_N. As new data words are "pushed" into data word 522_1, data in data word 522_N is "popped" off. Specifically, when field difference calculation unit 521 needs to write a new field to field difference into data word 522_1. The contents of data word 522_1 is copied into data word 522_2; the contents of data word 522_2 is copied into data word 522_3; the contents of data word 522_3 is copied into data word 522_4; and in general the contents of data word 522_X is copied into data word 522_X+1. Except that the contents of data word 522_N is not retained. In this manner, F2FD FIFO 522 stores the N most recent field to field differences calculated by field difference calculation unit 521.

Special pattern detector examines the contents of F2FD FIFO 522 to detect the selected special pattern of field to field differences. Mode detection control unit 526 uses the results of field to field differences in F2FD FIFO 522 and the results of special pattern detector 524 to control field merging and conversion unit 530 to properly create output progressive video stream O_PVS. Specifically, mode detection control unit 526 directs field combiner/interpolator 530 to either create a frame using normal mode deinterlacing on a field in buffer 510 (i.e. convert a field into a frame using interpolation, line repeat, etc.) or to create a frame using special mode deinterlacing (i.e. merging two fields from buffer 510).

In general the design of special pattern detector 524 depends on the number of data words available in F2FD FIFO 522 as well as the selected special pattern to be detected. For example, if the selected special pattern "LLLLSLLLL", and F2FD FIFO 522 includes nine data words 522_1, 522_2, . . . 522_9, special pattern detector 524 can be configured to find the selected special pattern by determining whether the field to field difference in data word 522_5 is smaller than all the field to field differences in the other data words. In some embodiments of the present invention, the selected special pattern may be larger than the number of data words in F2FD FIFO 522. For example, the selected special pattern may be "LLLLSLLLL" and F2FD FIFO 522 only contains five data words. For these embodiments, special pattern detector detects a subset of the special pattern and then mode detector control unit 526 determines whether incoming field to field differences conform to the selected special pattern. For example, special pattern detector 524 could be configured to detect the partial special patter "LLLLS" and then mode detector control unit 526 determines whether the next four incoming field to field differences from field difference calculation unit 521 are large (relative to the small value initially in data word 522_5).

Figure 6:
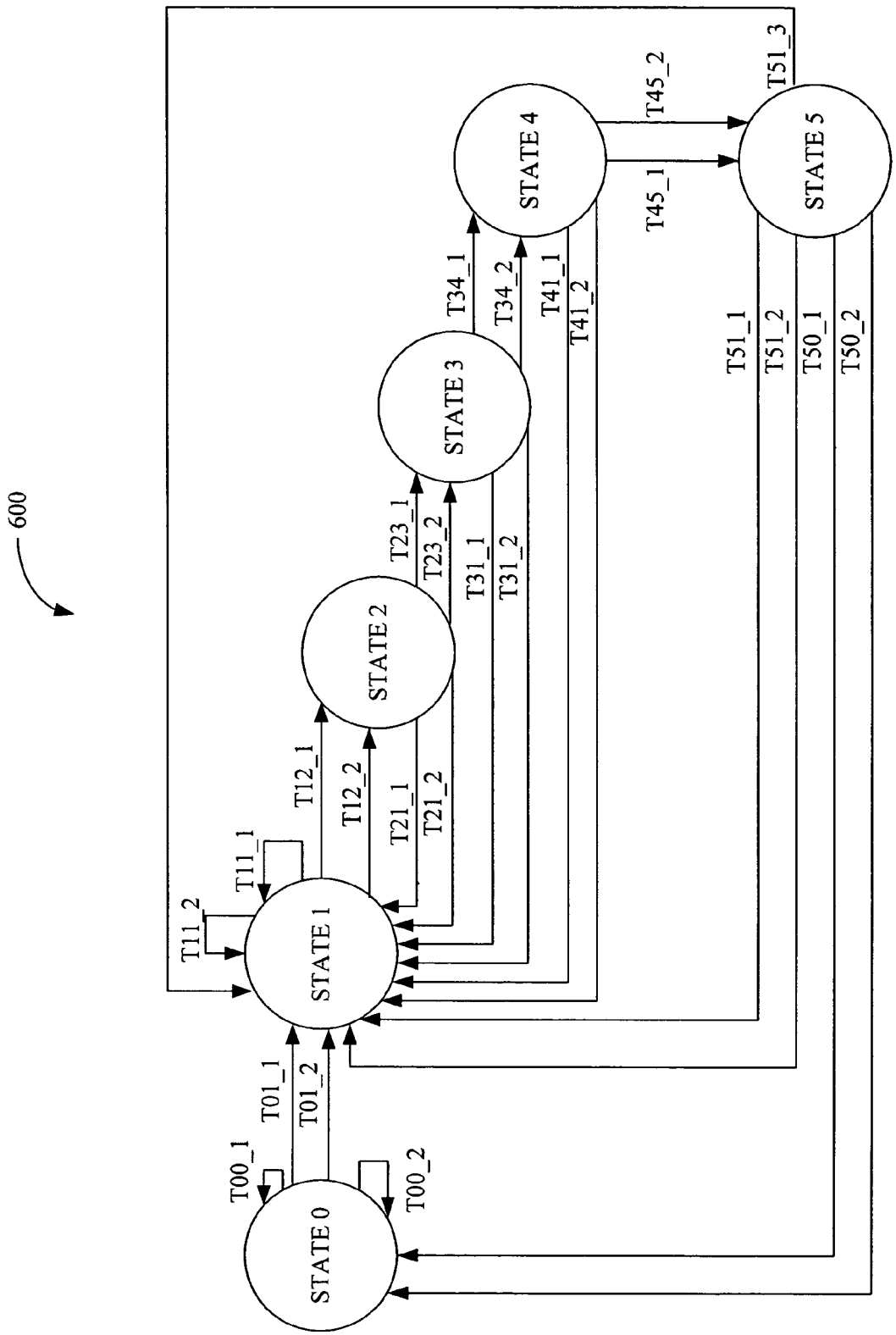
FIG. 6 is a simplified state machine for a mode detection control unit in accordance with one embodiment of the present invention.

FIG. 6 is a state diagram 600 for a state machine implementation of an embodiment of mode detection control unit 526, which can be used to perform special mode deinterlacing on 60 field per second interlaced video streams formed from 24 frames per second progressive video streams (as illustrated in FIG. 3). In the embodiment of FIG. 6, the selected special pattern is "LLLLSLLL" and F2FD FIFO 522 includes five data words. One skilled in the art can adapt the principles of the present invention for other types of special mode video streams, other special patterns, and other sizes of F2FD FIFO 522.

The state machine illustrated by state Diagram 600 makes use of a plurality of status flags, variables, and parameters, which are not shown in FIG. 6. The parameters include three user defined thresholds: pixel difference threshold T_PIX_DIFF (as explained above), enter special mode threshold T_S_ENTER (as explained above) and exit special mode threshold T_S_EXIT(as explained above). The state machine uses variables such as enter special mode counter ENTER_S_M_C, which counts the number of times the selected special pattern is detected, exit special mode counter EXIT_S_M_C, which counts the number of fields processed without finding the selected special pattern, state variable STATE, which indicates which state (numbered 0 to 5) the state machine is in, remaining special pattern count R_SP_CNT, which is used to count the number of new field to field differences that fits into the remaining portions of the selected special pattern, i.e. the parts of the special pattern not in the partial special pattern that was detected by special pattern detector 524. The state machine also uses various flags to help guide the state transitions. These flags typically can be set equal to two states indicated by a value of 0 or 1. A mode flag MODE_FLAG which can be set equal to the special state (value 1) or the normal state (value 0), indicates whether special mode deinterlacing or normal mode deinterlacing should be applied to a field. A partial special pattern flag P_SP_FLAG, which can be in the detected state (value 1) or the not detected state (value 0), indicates whether special pattern detector 524 detected the partial special pattern. A error flag ERR_FLAG, which can be in the error state (value 1), an error in special mode detection has occurred and normal mode deinterlacing should be applied to a field, or the no error state (value 0), which indicates no error is being detected.

During power on/reset enter special mode counter ENTER_S_M_C, exit special mode counter EXIT_S_M_C, state variable STATE, remaining special pattern count R_SP_CNT, error flag ERR_FLAG, mode flag MODE_FLAG, partial special pattern flag P_SP_FLAG are all initialized to be equal to 0. Furthermore, the data words in F2FD FIFO 522 are also initialized to be equal to 0.

Because state variable STATE is initialized to be equal to zero, the state machine would begin in state 0. From state 0 the state machine can take one of four transition paths T00_1, T00_2, T01_1, or T01_2. For clarity, the reference numerals for the transitions paths are of the form TXY_Z, where X indicates the starting state, Y indicates the ending state, and Z enumerates the different transitions that can be taken from the same starting state to the same ending state.

The state machine takes transition path T00_1, from state 0 back to state 0, when partial special pattern flag P_SP_FLAG is equal to 0 and mode flag MODE_FLAG is equal to zero. If the state machine takes transition path T00_1, remaining special pattern count R_SP_CNT is set equal to 0 and field merging and conversion unit 530 is controlled to use normal mode deinterlacing on the current field.

The state machine takes transition path T00_2, from state 0 back to state 0, when the partial special pattern flag P_SP_FLAG is equal to 0 and mode flag MODE_FLAG is equal to 1. If the state machine takes transition path T00_2, error flag ERR_FLAG is set equal to 1, field merging and conversion unit 530 is controlled to use normal mode deinterlacing on the current field, and exit special mode counter EXIT_S_M_C is incremented by 1. Furthermore, if exit special mode counter EXIT_S_M_C is equal to exit special mode threshold T_S_EXIT then mode flag MODE_FLAG is set equal 0, error flag ERR_FLAG is set equal to 0, and exit special mode counter EXIT_S_M_C is set equal to 0.

The state machine takes transition path T01_1, from state 0 to state 1, when partial special pattern flag P_SP_FLAG is equal to 1 and mode flag MODE_FLAG is equal to zero. If the state machine takes transition path T01_1, enter special mode counter ENTER_S_M_C is set equal to 0; state variable STATE is set equal to 1, and field merging and conversion unit 530 is controlled to use normal mode deinterlacing on the current field.

The state machine takes transition path T01_2, from state 0 to state 1, when the partial special pattern flag P_SP_FLAG is equal to 1 and mode flag MODE_FLAG is equal to 1. If the state machine takes transition path T01_2, error flag ERR_FLAG is set equal to 1, field merging and conversion unit 530 is controlled to use normal mode deinterlacing on the current field, and exit special mode counter EXIT_S_M_C is incremented by 1. Furthermore, if exit special mode counter EXIT_S_M_C is equal to exit special mode threshold T_S_EXIT then mode flag MODE_FLAG is set equal 0, error flag ERR_FLAG is set equal to 0, and exit special mode counter EXIT_S_M_C is set equal to 0.

The state machine takes transition path T11_1, from state 1 back to state 1, when partial special pattern flag P_SP_FLAG is equal to 1 and mode flag MODE_FLAG is equal to zero. If the state machine takes transition path T11_1, enter special mode counter ENTER_S_M_C is set equal to 0, and field merging and conversion unit 530 is controlled to use normal mode deinterlacing on the current field.

The state machine takes transition path T11_2, from state 1 back to state 1, when the partial special pattern flag P_SP_FLAG is equal to 1 and mode flag MODE_FLAG is equal to 1. If the state machine takes transition path T11_2, error flag ERR_FLAG is set equal to 1, field merging and conversion unit 530 is controlled to use normal mode deinterlacing on the current field, and exit special mode counter EXIT_S_M_C is incremented by 1. Furthermore, if exit special mode counter EXIT_S_M_C is equal to exit special mode threshold T_S_EXIT then mode flag MODE_FLAG is set equal 0, error flag ERR_FLAG is set equal to 0, and exit special mode counter EXIT_S_M_C is set equal to 0.

The state machine takes transition path T12_1, from state 1 to state 2, when partial special pattern flag P_SP_FLAG is equal to 0 and mode flag MODE_FLAG is equal to 0. If the state machine takes transition path T12_1, state variable STATE is set equal to 2, and field merging and conversion unit 530 is controlled to use normal mode deinterlacing on the current field. Furthermore, if the field to field difference in data word 522_1 is greater than the field to field difference in data word 522_2 and remaining special pattern count R_SP_CNT is equal to 4 then remaining special pattern count R_SP_CNT is set equal to 1. However, if the field to field difference in data word 522_1 is greater than the field to field difference in data word 522_2 and remaining special pattern count R_SP_CNT is not equal to 4 then remaining special pattern count R_SP_CNT is incremented by 1. However, if the field to field difference in data word 522_1 is not greater than the field to field difference in data word 522_2 then remaining special pattern count R_SP_CNT is set equal to 0.

The state machine takes transition path T12_2, from state 1 to state 2, when partial special pattern flag P_SP_FLAG is equal to 0 and mode flag MODE_FLAG is equal to 1. If the state machine takes transition path T12_2, state variable STATE is set equal to 2. If error flag ERR_FLAG is equal to 1 then field merging and conversion unit 530 is controlled to use normal mode deinterlacing on the current field. If however, error flag ERR_FLAG is equal to 0, then field merging and conversion unit 530 is controlled to use special mode deinterlacing on the current field by merging the current field and the late field. Furthermore, if the field to field difference in data word 522_1 is greater than the field to field difference in data word 522_2 and remaining special pattern count R_SP_CNT is equal to 4 then remaining special pattern count R_SP_CNT is set equal to 1. However, if the field to field difference in data word 522_1 is greater than the field to field difference in data word 522_2 and remaining special pattern count R_SP_CNT is not equal to 4 then remaining special pattern count R_SP_CNT is incremented by 1. However, if the field to field difference in data word 522_1 is not greater than the field to field difference in data word 522_2 then remaining special pattern count R_SP_CNT is set equal to 0. Furthermore if error flag ERR_FLAG is equal to 1, then exit special mode counter EXIT_S_M_C is incremented by 1 and if after incrementing exit special mode counter EXIT_S_M_C, exit special mode counter EXIT_S_M_C is equal to exit special mode threshold T_S_EXIT, then mode flag MODE_FLAG is set equal 0, error flag ERR_FLAG is set equal to 0, and exit special mode counter EXIT_S_M_C is set equal to 0.

The state machine takes transition path T21_1, from state 2 to state 1, when partial special pattern flag P_SP_FLAG is equal to 1 and mode flag MODE_FLAG is equal to zero. If the state machine takes transition path T21_1, enter special mode counter ENTER_S_M_C is set equal to 0, state variable STATE is set equal to 1, and field merging and conversion unit 530 is controlled to use normal mode deinterlacing on the current field.

The state machine takes transition path T21_2, from state 2 to state 1, when the partial special pattern flag P_SP_FLAG is equal to 1 and mode flag MODE_FLAG is equal to 1. If the state machine takes transition path T21_2, error flag ERR_FLAG is set equal to 1, state variable STATE is set equal to 1, and field merging conversion unit 530 is controlled to use normal mode deinterlacing on the current field, and exit special mode counter EXIT_S_M_C is incremented by 1. Furthermore, if exit special mode counter EXIT_S_M_C is equal to exit special mode threshold T_S_EXIT then mode flag MODE_FLAG is set equal 0, error flag ERR_FLAG is set equal to 0, and exit special mode counter EXIT_S_M_C is set equal to 0.

The state machine takes transition path T23_1, from state 2 to state 3, when partial special pattern flag P_SP_FLAG is equal to 0 and mode flag MODE_FLAG is equal to 0. If the state machine takes transition path T23_1, state variable STATE is set equal to 3, and field merging and conversion unit 530 is controlled to use normal mode deinterlacing on the current field. Furthermore, if the field to field difference in data word 522_1 is greater than the field to field difference in data word 522_3 and remaining special pattern count R_SP_CNT is equal to 4 then remaining special pattern count R_SP_CNT is set equal to 1. However, if the field to field difference in data word 522_1 is greater than the field to field difference in data word 522_3 and remaining special pattern count R_SP_CNT is not equal to 4 then remaining special pattern count R_SP_CNT is incremented by 1. However, if the field to field difference in data word 522_1 is not greater than the field to field difference in data word 522_3 then remaining special pattern count R_SP_CNT is set equal to 0.

The state machine takes transition path T23_2, from state 2 to state 3, when partial special pattern flag P_SP_FLAG is equal to 0 and mode flag MODE_FLAG is equal to 1. If the state machine takes transition path T23_2, state variable STATE is set equal to 3. If error flag ERR_FLAG is equal to 1 then field merging and conversion unit 530 is controlled to use normal mode deinterlacing on the current field. If however, error flag ERR_FLAG is equal to 0, then field merging and conversion unit 530 is controlled to use special mode deinterlacing on the current field by merging the current field and the early field. Furthermore, if the field to field difference in data word 522_1 is greater than the field to field difference in data word 522_3 and remaining special pattern count R_SP_CNT is equal to 4 then remaining special pattern count R_SP_CNT is set equal to 1. However, if the field to field difference in data word 522_1 is greater than the field to field difference in data word 522_3 and remaining special pattern count R_SP_CNT is not equal to 4 then remaining special pattern count R_SP_CNT is incremented by 1. However, if the field to field difference in data word 522_1 is not greater than the field to field difference in data word 522_3 then remaining special pattern count R_SP_CNT is set equal to 0. Furthermore if error flag ERR_FLAG is equal to 1, then exit special mode counter EXIT_S_M_C is incremented by 1 and if after incrementing exit special mode counter EXIT_S_M_C, exit special mode counter EXIT_S_M_C is equal to exit special mode threshold T_S_EXIT, then mode flag MODE_FLAG is set equal 0, error flag ERR_FLAG is set equal to 0, and exit special mode counter EXIT_S_M_C is set equal to 0.

The state machine takes transition path T31_1, from state 3 to state 1, when partial special pattern flag P_SP_FLAG is equal to 1 and mode flag MODE_FLAG is equal to zero. If the state machine takes transition path T31_1, enter special mode counter ENTER_S_M_C is set equal to 0, state variable STATE is set equal to 1, and field merging and conversion unit 530 is controlled to use normal mode deinterlacing on the current field.

The state machine takes transition path T31_2, from state 3 to state 1, when the partial special pattern flag P_SP_FLAG is equal to 1 and mode flag MODE_FLAG is equal to 1. If the state machine takes transition path T31_2, error flag ERR_FLAG is set equal to 1, state variable STATE is set equal to 1, field merging and conversion unit 530 is controlled to use normal mode deinterlacing on the current field, and exit special mode counter EXIT_S_M_C is incremented by 1. Furthermore, if exit special mode counter EXIT_S_M_C is equal to exit special mode threshold T_S_EXIT then mode flag MODE_FLAG is set equal 0, error flag ERR_FLAG is set equal to 0, and exit special mode counter EXIT_S_M_C is set equal to 0.

The state machine takes transition path T34_1, from state 3 to state 4, when partial special pattern flag P_SP_FLAG is equal to 0 and mode flag MODE_FLAG is equal to 0. If the state machine takes transition path T34_1, state variable STATE is set equal to 4, and field merging and conversion unit 530 is controlled to use normal mode deinterlacing on the current field. Furthermore, if the field to field difference in data word 522_1 is greater than the field to field difference in data word 522_4 and remaining special pattern count R_SP_CNT is equal to 4 then remaining special pattern count R_SP_CNT is set equal to 1. However, if the field to field difference in data word 522_1 is greater than the field to field difference in data word 522_4 and remaining special pattern count R_SP_CNT is not equal to 4 then remaining special pattern count R_SP_CNT is incremented by 1. However, if the field to field difference in data word 522_1 is not greater than the field to field difference in data word 522_4 then remaining special pattern count R_SP_CNT is set equal to 0.

The state machine takes transition path T34_2, from state 3 to state 4, when partial special pattern flag P_SP_FLAG is equal to 0 and mode flag MODE_FLAG is equal to 1. If the state machine takes transition path T34_2, state variable STATE is set equal to 4. If error flag ERR_FLAG is equal to 1 then field merging and conversion unit 530 is controlled to use normal mode deinterlacing on the current field. If however, error flag ERR_FLAG is equal to 0, then field merging and conversion unit 530 is controlled to use special mode deinterlacing on the current field by merging the current field and the late field. Furthermore, if the field to field difference in data word 522_1 is greater than the field to field difference in data word 522_4 and remaining special pattern count R_SP_CNT is equal to 4 then remaining special pattern count R_SP_CNT is set equal to 1. However, if the field to field difference in data word 522_1 is greater than the field to field difference in data word 522_4 and remaining special pattern count R_SP_CNT is not equal to 4 then remaining special pattern count R_SP_CNT is incremented by 1. However, if the field to field difference in data word 522_1 is not greater than the field to field difference in data word 522_4 then remaining special pattern count R_SP_CNT is set equal to 0. Furthermore if error flag ERR_FLAG is equal to 1, then exit special mode counter EXIT_S_M_C is incremented by 1 and if after incrementing exit special mode counter EXIT_S_M_C, exit special mode counter EXIT_S_M_C is equal to exit special mode threshold T_S_EXIT, then mode flag MODE_FLAG is set equal 0, error flag ERR_FLAG is set equal to 0, and exit special mode counter EXIT_S_M_C is set equal to 0.

The state machine takes transition path T41_1, from state 4 to state 1, when partial special pattern flag P_SP_FLAG is equal to 1 and mode flag MODE_FLAG is equal to zero. If the state machine takes transition path T41_1, enter special mode counter ENTER_S_M_C is set equal to 0, state variable STATE is set equal to 1, and field merging and conversion unit 530 is controlled to use normal mode deinterlacing on the current field.

The state machine takes transition path T41_2, from state 4 to state 1, when the partial special pattern flag P_SP_FLAG is equal to 1 and mode flag MODE_FLAG is equal to 1. If the state machine takes transition path T41_2, error flag ERR_FLAG is set equal to 1, state variable STATE is set equal to 1, field merging and conversion unit 530 is controlled to use normal mode deinterlacing on the current field, and exit special mode counter EXIT_S_M_C is incremented by 1. Furthermore, if exit special mode counter EXIT_S_M_C is equal to exit special mode threshold T_S_EXIT then mode flag MODE_FLAG is set equal 0, error flag ERR_FLAG is set equal to 0, and exit special mode counter EXIT_S_M_C is set equal to 0.

The state machine takes transition path T45_1, from state 4 to state 5, when partial special pattern flag P_SP_FLAG is equal to 0 and mode flag MODE_FLAG is equal to 0. If the state machine takes transition path T45_1, state variable STATE is set equal to 5, and field merging and conversion unit 530 is controlled to use normal mode deinterlacing on the current field. Furthermore, if the field to field difference in data word 522_1 is greater than the field to field difference in data word 522_5 and remaining special pattern count R_SP_CNT is equal to 4 then remaining special pattern count R_SP_CNT is set equal to 1. However, if the field to field difference in data word 522_1 is greater than the field to field difference in data word 522_5 and remaining special pattern count R_SP_CNT is not equal to 4 then remaining special pattern count R_SP_CNT is incremented by 1. However, if the field to field difference in data word 522_1 is not greater than the field to field difference in data word 522_5 then remaining special pattern count R_SP_CNT is set equal to 0.

The state machine takes transition path T45_2, from state 4 to state 5, when partial special pattern flag P_SP_FLAG is equal to 0 and mode flag MODE_FLAG is equal to 1. If the state machine takes transition path T45_2, state variable STATE is set equal to 5. If error flag ERR_FLAG is equal to 1 then field merging and conversion unit 530 is controlled to use normal mode deinterlacing on the current field. If however, error flag ERR_FLAG is equal to 0, then field merging and conversion unit 530 is controlled to use special mode deinterlacing on the current field by merging the current field and the late field. Furthermore, if the field to field difference in data word 522_1 is greater than the field to field difference in data word 522_5 and remaining special pattern count R_SP_CNT is equal to 4 then remaining special pattern count R_SP_CNT is set equal to 1. However, if the field to field difference in data word 522_1 is greater than the field to field difference in data word 522_5 and remaining special pattern count R_SP_CNT is not equal to 4 then remaining special pattern count R_SP_CNT is incremented by 1. However, if the field to field difference in data word 522_1 is not greater than the field to field difference in data word 522_5 then remaining special pattern count R_SP_CNT is set equal to 0. Furthermore if error flag ERR_FLAG is equal to 1, then exit special mode counter EXIT_S_M_C is incremented by 1 and if after incrementing exit special mode counter EXIT_S_M_C, exit special mode counter EXIT_S_M_C is equal to exit special mode threshold T_S_EXIT, then mode flag MODE_FLAG is set equal 0, error flag ERR_FLAG is set equal to 0, and exit special mode counter EXIT_S_M_C is set equal to 0.

The state machine takes transition path T51_1, from state 5 to state 1, when partial special pattern flag P_SP_FLAG is equal to 1, mode flag MODE_FLAG is equal to zero, and remaining special pattern count R_SP_CNT is equal to 4. If the state machine takes transition path T51_1, state variable STATE is set equal to 1 and field merging and conversion unit 530 is controlled to use normal mode deinterlacing on the current field.

The state machine takes transition path T51_2, from state 5 to state 1, when partial special pattern flag P_SP_FLAG is equal to 1, mode flag MODE_FLAG is equal to zero, and remaining special pattern count R_SP_CNT is not equal to 4. If the state machine takes transition path T51_2, state variable STATE is set equal to 1 and enter special mode counter ENTER_S_M_C is incremented by 1. Furthermore, if enter special mode counter ENTER_S_M_C is equal to enter special mode threshold T_S_ENTER, then mode flag MODE_FLAG is set equal to 1, enter special mode counter ENTER_S_M_C is set equal to 0, and field merging and conversion unit 530 is controlled to use special mode deinterlacing to merge the current field and the early field. However, if enter special mode counter ENTER_S_M_C is not equal to enter special mode threshold T_S_ENTER, then and field merging and conversion unit 530 is controlled to use normal mode deinterlacing on the current field.

The state machine takes transition path T51_3, from state 5 to state 1, when the partial special pattern flag P_SP_FLAG is equal to 1 and mode flag MODE_FLAG is equal to 1. If the state machine takes transition path T51_3, error flag ERR_FLAG is set equal to 0, state variable STATE is set equal to 1, exit special mode counter EXIT_S_M_C is set equal to zero, and field merging and conversion unit 530 is controlled to use special mode deinterlacing to merge the current field with the early field.

The state machine takes transition path T50_1, from state 5 to state 0, when partial special pattern flag P_SP_FLAG is equal to 0 and mode flag MODE_FLAG is equal to 0. If the state machine takes transition path T50_1, state variable STATE is set equal to 0, remaining special pattern count R_SP_CNT is set equal to 0, and field merging and conversion unit 530 is controlled to use normal mode deinterlacing on the current field.

The state machine takes transition path T50_2, from state 5 to state 0, when partial special pattern flag P_SP_FLAG is equal to 0 and mode flag MODE_FLAG is equal to 1. If the state machine takes transition path T50_2, state variable STATE is set equal to 0, error flag ERR_FLAG is set equal to 1, field merging and conversion unit 530 is controlled to use normal mode deinterlacing on the current field, and exit special mode counter EXIT_S_M_C is incremented by 1. Furthermore, if exit special mode counter EXIT_S_M_C is equal to exit special mode threshold T_S_EXIT, then mode flag MODE_FLAG is set equal 0, error flag ERR_FLAG is set equal to 0, and exit special mode counter EXIT_S_M_C is set equal to 0.

APPENDIX I provides another embodiment of a deinterlacing system accordance with the present invention implemented in pseudocode. One skilled in the art can easily convert the pseudocode to a hardware definition language such as VHDL or Verilog to create a deinterlacing system in accordance with the present invention.

In the various embodiments of the present invention, novel structures have been described for deinterlacing systems. By using field to field differences a novel method for detecting special mode video streams is achieved. The various embodiments of the structures and methods of this invention that are described above are illustrative only of the principles of this invention and are not intended to limit the scope of the invention to the particular embodiments described. For example, in view of this disclosure those skilled in the art can define other special patterns, special mode deinterlacing techniques, normal mode deinterlacing techniques, buffers, mode detectors, field to field difference calculation units, special pattern detectors, field merging and conversion units, threshold levels, and so forth, and use these alternative features to create a method, circuit, or system according to the principles of this invention. Thus, the invention is limited only by the following claims.

APPENDIX I

Copyright (c) 2003 HUAYA Microelectronics (Shanghai), INC.

All Rights Reserved

```
MEMORY DEFINITION
    FIELD_BUFF_1;
    FIELD_BUFF_2;
    FIELD_BUFF_3;
        "Three field buffers that work as a FIFO with new fields"
            "being pushed into FIELD_BUFF_3 and popped out of "
            "FIELD_BUFF_1"
    FTF1;
    FTF2;
    FTF3;
    FTF4;
    FTF5;
        "Five field to field difference values that"
            "are arranged as a FIFO with New data pushed into FTF5"
            "and old data popped out of FTF1"
INITIALIZTION
    define NORMAL=0
    define SPECIAL=1
    user define T_PIX_DIFF; "pixel difference threshold"
```

-continued

```
    user define T_S_ENTER;    "enter special mode threshold "
                              "(# of times the selected special"
                              " pattern is detected"
    user define T_S_EXIT;    "exit special mode threshold (# of"
                              "fields"
    ENTER_S_M_C=0;"Enter Special Mode Counter "
                "i.e., # of times the selected special pattern is"
                "    detected"
    EXIT_S_M_C=0; "Exit Special Mode Counter "
                " i.e. # of fields without finding the selected"
                " special pattern"
    STATE=0; "state variable"
    R_SP_CNT=0;   "remaining special pattern count"
                  "(R_SP_CNT is used to count the number of new"
                  "field to field differences that fits into the"
                  "remaining portions of the selected special"
                  "pattern that was partially detected in the"
                  "field to field difference registers"
    ERR_FLAG=0;   "ERR_FLAG indicates bad edit detection"
                  "in special mode"
    MODE_FLAG=NORMAL;   "mode of operation NORMAL=0, SPECIAL=1"
    P_SP_FLAG=0;           "partial special pattern flag (indicates whether"
                           "the field to field differences partially"
                           "matches the selected special pattern"
    FTF0=0; "Field to field difference value 0"
    FTF1=0; "Field to field difference value 1"
    FTF2=0; "Field to field difference value 2"
    FTF3=0; "Field to field difference value 3"
    FTF4=0; "Field to field difference value 4"
START MARKER:
    push new field into FIELD_BUFF_3;
    "SHIFT FTF registers"
    FTF2=FTF1;
    FTF3=FTF2;
    FTF4=FTF3;
    FTF5=FTF4;
    "calculate field to field difference between FIELD_BUFF_1"
    "and FIELD_BUFF_3"
    FTF1=0;
    For each pixel X in FIELD_BUFF_3
        {
        if abs[FIELD_BUFF_3(X)-FIELD_BUFF_1(X)] > T_PIX_DIFF
        then FTF1=FTF1+abs[FIELD_BUFF_3(X)-FIELD_BUFF_1(X)];
        }
DETECT MODE PROCESS
    if FTF1 < MIN (FTF2, FTF3, FTF4, FTF5)
        then P_SP_FLAG = 1
        else P_SP_FLAG = 0;
    if state=0 goto STATE 0 MARKER:
    if state=1 goto STATE 1 MARKER:
    if state=2 goto STATE 2 MARKER:
    if state=3 goto STATE 3 MARKER:
    if state=4 goto STATE 4 MARKER:
    if state=5 goto STATE 5 MARKER:
STATE 0 MARKER:
    if (P_SP_FLAG=1) and (MODE_FLAG = NORMAL)then
        {
        ENTER_S_M_C=0;
        STATE=1;
        perform normal mode deinterlacing;
        goto START MARKER:
        }
    if (P_SP_FLAG=1) and (MODE_FLAG = SPECIAL)then
        {
        ERR_FLAG=1;
        EXIT_S_M_C=EXIT_S_M_C + 1;
        STATE=1;
        perform normal mode deinterlacing;
        if EXIT_S_M_C=T_S_EXIT then
            {
            MODE_FLAG=NORMAL;
            ERR_FLAG=0;
            EXIT_S_M_C=0'
            }
        goto START MARKER:
        }
    if (P_SP_FLAG=0) and (MODE_FLAG = NORMAL)then
        {
        R_SP_CNT=0;
```

```
            perform normal mode deinterlacing;
            goto START MARKER:
            }
        if (P_SP_FLAG=0) and (MODE_FLAG = SPECIAL)then
            {
            ERR_FLAG=1;
            perform normal mode deinterlacing;
            EXIT_S_M_C=EXIT_S_M_C+1;
            if EXIT_S_M_C = T_S_EXIT then
                {
                MODE_FLAG=NORMAL;
                ERR_FLAG=0;
                EXIT_S_M_C=0'
                }
            goto START MARKER:
            }
STATE 1 MARKER:
        if (P_SP_FLAG=1) and (MODE_FLAG = NORMAL)then
            {
            ENTER_S_M_C=0;
            perform normal mode deinterlacing;
            goto START MARKER:
            }
        if (P_SP_FLAG=1) and (MODE_FLAG = SPECIAL)then
            {
            ERR_FLAG=1;
            EXIT_S_M_C=EXIT_S_M_C + 1;
            STATE=1;
            perform normal mode deinterlacing;
            if EXIT_S_M_C=T_S_EXIT then
                {
                MODE_FLAG=NORMAL;
                ERR_FLAG=0;
                EXIT_S_M_C=0'
                }
            goto START MARKER:
            }
        if (P_SP_FLAG=0) and (MODE_FLAG = NORMAL)then
            {
            STATE=2;
            if FTF1>FTF2 then
                if R_SP_CNT=4 then R_SP_CNT=1 else R_SP_CNT=R_SP_CNT+1
            else R_SP_CNT=0;
            perform normal mode deinterlacing;
            goto START MARKER:
            }
        if (P_SP_FLAG=0) and (MODE_FLAG = SPECIAL)then
            {
            STATE=2;
            if ERR_FLAG=1 then perform normal mode deinterlacing
            else merge FIELD_BUFFER_2 and FIELD_BUFFER_3;
            if FTF1>FTF2 then
                if R_SP_CNT=4 then R_SP_CNT=1 else R_SP_CNT=R_SP_CNT+1
            else R_SP_CNT=0;
            if ERR_FLAG=1 then
                EXIT_S_M_C=EXIT_S_M_C+1;
                if EXIT_S_M_C = T_S_EXIT then
                    {
                    MODE_FLAG=NORMAL;
                    ERR_FLAG=0;
                    EXIT_S_M_C=0'
                    }
            goto START MARKER:
            }
STATE 2 MARKER:
        if (P_SP_FLAG=1) and (MODE_FLAG = NORMAL)then
            {
            ENTER_S_M_C=0;
            STATE=1;
            perform normal mode deinterlacing;
            goto START MARKER:
            }
        if (P_SP_FLAG=1) and (MODE_FLAG = SPECIAL)then
            {
            ERR_FLAG=1;
            EXIT_S_M_C=EXIT_S_M_C + 1;
            STATE=1;
            perform normal mode deinterlacing;
            if EXIT_S_M_C=T_S_EXIT then
```

```
            {
            MODE_FLAG=NORMAL;
            ERR_FLAG=0;
            EXIT_S_M_C=0'
            }
        goto START MARKER:
        }
    if (P_SP_FLAG=0) and (MODE_FLAG = NORMAL)then
        {
        STATE=3;
        if FTF1>FTF3 then
            if R_SP_CNT=4 then R_SP_CNT=1 else R_SP_CNT=R_SP_CNT+1
        else R_SP_CNT=0;
        perform normal mode deinterlacing;
        goto START MARKER:
        }
    if (P_SP_FLAG=0) and (MODE_FLAG = SPECIAL)then
        {
        STATE=3;
        if ERR_FLAG=1 then perform normal mode deinterlacing
        else merge FIELD_BUFFER_2 and FIELD_BUFFER_1;
        if FTF1>FTF3 then
            if R_SP_CNT=4 then R_SP_CNT=1 else R_SP_CNT=R_SP_CNT+1
        else R_SP_CNT=0;
        if ERR_FLAG=1 then
            EXIT_S_M_C=EXIT_S_M_C+1;
            if EXIT_S_M_C = T_S_EXIT then
                {
                MODE_FLAG=NORMAL;
                ERR_FLAG=0;
                EXIT_S_M_C=0'
                }
        goto START MARKER:
        }
STATE 3 MARKER:
    if (P_SP_FLAG=1) and (MODE_FLAG = NORMAL)then
        {
        ENTER_S_M_C=0;
        STATE=1;
        perform normal mode deinterlacing;
        goto START MARKER:
        }
    if (P_SP_FLAG=1) and (MODE_FLAG = SPECIAL)then
        {
        ERR_FLAG=1;
        EXIT_S_M_C=EXIT_S_M_C + 1;
        STATE=1;
        perform normal mode deinterlacing;
            if EXIT_S_M_C=T_S_EXIT then
                {
                MODE_FLAG=NORMAL;
                ERR_FLAG=0;
                EXIT_S_M_C=0'
                }
        goto START MARKER:
        }
    if (P_SP_FLAG=0) and (MODE_FLAG = NORMAL)then
        {
        STATE=4;
        if FTF1>FTF4 then
            if R_SP_CNT=4 then R_SP_CNT=1 else R_SP_CNT=R_SP_CNT+1
        else R_SP_CNT=0;
        perform normal mode deinterlacing;
        goto START MARKER:
        }
    if (P_SP_FLAG=0) and (MODE_FLAG = SPECIAL)then
        {
        STATE=4;
        if ERR_FLAG=1 then perform normal mode deinterlacing
        else merge FIELD_BUFFER_2 and FIELD_BUFFER_3;
        if FTF1>FTF4 then
            if R_SP_CNT=4 then R_SP_CNT=1 else R_SP_CNT=R_SP_CNT+1
        else R_SP_CNT=0;
        if ERR_FLAG=1 then
            EXIT_S_M_C=EXIT_S_M_C+1;
            if EXIT_S_M_C = T_S_EXIT then
                {
                MODE_FLAG=NORMAL;
                ERR_FLAG=0;
```

```
                EXIT_S_M_C=0'
                }
            goto START MARKER:
            }
STATE 4 MARKER:
    if (P_SP_FLAG=1) and (MODE_FLAG = NORMAL)then
        {
        ENTER_S_M_C=0;
        STATE=1;
        perform normal mode deinterlacing;
        goto START MARKER:
        }
    if (P_SP_FLAG=1) and (MODE_FLAG = SPECIAL)then
        {
        ERR_FLAG=1;
        EXIT_S_M_C=EXIT_S_M_C + 1;
        STATE=1;
        perform normal mode deinterlacing;
        if EXIT_S_M_C=T_S_EXIT then
                {
                MODE_FLAG=NORMAL;
                ERR_FLAG=0;
                EXIT_S_M_C=0'
                }
        goto START MARKER:
        }
    if (P_SP_FLAG=0) and (MODE_FLAG = NORMAL)then
        {
        STATE=5;
        if FTF1>FTF5 then
                if R_SP_CNT=4 then R_SP_CNT=1 else R_SP_CNT=R_SP_CNT+1
            else R_SP_CNT=0;
        perform normal mode deinterlacing;
        goto START MARKER:
        }
    if (P_SP_FLAG=0) and (MODE_FLAG = SPECIAL)then
        {
        STATE=5;
        if ERR_FLAG=1 then perform normal mode deinterlacing
            else merge FIELD_BUFFER_2 and FIELD_BUFFER_3;
        if FTF1>FTF5 then
                if R_SP_CNT=4 then R_SP_CNT=1 else R_SP_CNT=R_SP_CNT+1
            else R_SP_CNT=0;
        if ERR_FLAG=1 then
                EXIT_S_M_C=EXIT_S_M_C+1;
                if EXIT_S_M_C = T_S_EXIT then
                    {
                    MODE_FLAG=NORMAL;
                    ERR_FLAG=0;
                    EXIT_S_M_C=0'
                    }
        goto START MARKER:
        }
STATE 5 MARKER:
    if (P_SP_FLAG=1) and (MODE_FLAG = NORMAL)then
        {
        if R_SP_CNT=4 then
                {
                ENTER_S_M_C=ENTER_S_M_C+1;
                STATE=1;
                if ENTER_S_M_C=T_S_ENTER then
                    {
                    MODE_FLAG=SPECIAL;
                    ENTER_S_M_C=0;
                    merge FIELD_BUFFER_2 and FIELD_BUFFER_1;
                    }
                else perform normal mode deinterlacing;
            else
                {
                STATE=1;
                perform normal mode deinterlacing;
                }
            goto START MARKER:
        }
    if (P_SP_FLAG=1) and (MODE_FLAG = SPECIAL)then
        {
        ERR_FLAG=0;
        EXIT_S_M_C=0;
        STATE=1;
```

```
        merge FIELD_BUFFER_2 and FIELD_BUFFER_1;
        goto START MARKER:
        }
    if (P_SP_FLAG=0) and (MODE_FLAG = NORMAL)then
        {
        STATE=0;
        R_SP_CNT=0;
        perform normal mode deinterlacing;
        goto START MARKER:
        }
    if (P_SP_FLAG=0) and (MODE_FLAG = SPECIAL)then
        {
        STATE=0;
        ERR_FLAG=1;
        perform normal mode deinterlacing;
        EXIT_S_M_C=EXIT_S_M_C+1;
        if EXIT_S_M_C = T_S_EXIT then
            {
            MODE_FLAG=NORMAL;
            ERR_FLAG=0;
            EXIT_S_M_C=0'
            }
        goto START MARKER:
        }
```

What is claimed is:

1. A method of deinterlacing an input interlaced video stream having a plurality of fields to form an output progressive video stream having a plurality of frames, the method comprising:
   calculating a plurality of field to field differences;
   detecting a selected special pattern in the plurality of field to field differences;
   classifying the input interlaced video stream based on detection of the selected special pattern by
      incrementing an enter special mode counter when the selected special pattern is detected;
   performing special mode deinterlacing when the input interlaced video stream is classified as a special mode video stream; and
   performing normal mode deinterlacing when the input interlaced video stream is classified as normal mode video stream.

2. The method of claim 1, wherein the performing special mode deinterlacing when the input interlaced video stream is classified as special mode, comprises merging two fields from the input interlaced video stream to form a frame of the output progressive video stream.

3. The method of claim 2, wherein the merging two fields from the input interlaced video stream to form a frame of the output progressive video stream, comprises merging a current field with a late field, wherein the late field follows the current field in the interlaced video stream.

4. The method of claim 2, wherein the merging two fields from the input interlaced video stream to form a frame of the output progressive video stream, comprises merging a current field with an early field, wherein the current field follows the early field in the interlaced video stream.

5. The method of claim 1, wherein the performing normal mode deinterlacing when the input interlaced video stream is classified as normal mode comprises repeating each scan lines in a current field to form a frame.

6. The method of claim 1, wherein the performing normal mode deinterlacing when the input interlaced video stream is classified as normal mode comprises interpolating two scan lines of a field to form a missing scan line.

7. The method of claim 1, wherein the classifying the input interlaced video stream based on detection of the selected special pattern further comprises:
   classifying the input interlaced video stream as special mode when the enter special mode counter equals a special mode threshold.

8. The method of claim 7, wherein the classifying the input interlaced video stream based on detection of the selected special pattern comprises:
   incrementing an exit special mode counter when the selected special pattern is not detected;
   classifying the input interlaced video stream as normal mode when the exit special mode counter equals an exit special mode threshold.

9. The method of claim 1, wherein the detecting a selected special pattern in the plurality of field to field differences comprises determining whether a first field to field difference of the plurality of field to field differences is smaller than each member of a first subset of the plurality of field to field differences.

10. The method of claim 9, wherein the detecting a selected special pattern in the plurality of field to field differences further comprises determining whether a second field to field difference of the plurality of field to field differences is smaller than each member of a second subset of the plurality of field to field differences.

11. The method of claim 1, wherein the detecting a selected special pattern in the plurality of field to field differences further comprises:
   detecting a partial special pattern in the plurality of field to field differences, wherein the partial special pattern is a subset of the selected special pattern; and
   determining whether additional field to field differences match a remaining special pattern; wherein the remaining special pattern is a subset of the selected special pattern.

12. The method of claim 1, wherein the calculating a plurality of field to field differences comprises:
   calculating an absolute difference between each pixel of a subset of pixels of a first field with a corresponding pixel of a second field to form a plurality of absolute differences for the first field;

summing each absolute difference to generate a field to field difference for the first field.

13. The method of claim 1, wherein the subset of pixels of a first field contains all the pixels of the first field.

14. The method of claim 1, wherein the calculating a plurality of field to field differences comprises:
calculating an absolute difference between each pixel of a subset of pixels of a first field with a corresponding pixel of a second field to form a plurality of absolute differences for the first field;
comparing each absolute difference with a difference threshold;
summing each absolute difference greater than the difference threshold to generate a field to field difference for the first field.

15. The method of claim 1, wherein the calculating a plurality of field to field differences comprises:
calculating an absolute difference between each pixel of a subset of pixels of a first field with a corresponding pixel of a second field to form a plurality of absolute differences for the first field;
comparing each absolute difference with a difference threshold;
incrementing a field to field difference for the first field by one for each absolute difference greater than the difference threshold.

16. A deinterlacer for deinterlacing an input interlaced video stream having a plurality of fields to form an output progressive video stream having a plurality of frames, the deinterlacer comprising:
a buffer coupled to receive the input interlaced video stream;
a mode detector coupled to the buffer and configured to detect whether the input interlaced video stream is in a special mode; and wherein the mode detector further comprises a special mode counter configured to increment when a special pattern in the input interlaced video stream is detected; and
a field merging and conversion unit coupled to the buffer and the mode detector and configured by the mode detector to perform special mode deinterlacing when the input interlaced video stream is in the special mode and to perform normal mode deinterlacing when the input interlaced video stream is in a normal mode.

17. The deinterlacer of claim 16, wherein the buffer comprises:
a first field buffer;
a second field buffer; and
a third field buffer.

18. The deinterlacer of claim 17, wherein the buffer is configured to operate as a circular buffer.

19. The deinterlacer of claim 16, wherein the mode detector comprises:
a field difference calculation unit coupled to the buffer; and
a field to field difference FIFO coupled to the field difference calculation unit.

20. The deinterlacer of claim 19, wherein the field difference calculation unit is configured to calculate a field to field difference of an early field in the buffer and a late field in the buffer.

21. The deinterlacer of claim 20, wherein the field difference calculation unit is configured to store the field to field difference in the field to field difference FIFO.

22. The deinterlacer of claim 19, wherein the mode detector further comprises a special pattern detector coupled to the field to field difference FIFO and configured to detect a selected special patter in the field to field difference FIFO.

23. The deinterlacer of claim 22, wherein the mode detector further comprises a further comprising a mode detector control unit coupled to the field to field difference FIFO, the special pattern detector, and the field merging and conversion unit.

24. The deinterlacer of claim 23, wherein the mode detector control unit is configured to determine whether the input interlaced video stream is a special mode video stream.

25. The deinterlacer of claim 24, wherein the mode detector control unit configures the field merging and conversion unit to perform special mode deinterlacing when the input interlaced video stream is a special mode video stream.

26. The deinterlacer of claim 25, wherein the mode detector control unit configures the field merging and conversion unit to perform normal mode deinterlacing when the input interlaced video stream not a special mode video stream.

27. A system for deinterlacing an input interlaced video stream having a plurality of fields to form an output progressive video stream having a plurality of frames, the system comprising:
means for calculating a plurality of field to field differences;
means for detecting a selected special pattern in the plurality of field to field differences;
means for classifying the input interlaced video stream based on detection of the selected special pattern, wherein the means for classifying further comprises means for incrementing an enter special mode counter when the selected special pattern is detected;
means for performing special mode deinterlacing when the input interlaced video stream is classified as a special mode video stream; and
means for performing normal mode deinterlacing when the input interlaced video stream is classified as normal mode video stream.

28. The system of claim 27, wherein the means for performing special mode deinterlacing when the input interlaced video stream is classified as special mode, comprises means for merging two fields from the input interlaced video stream to form a frame of the output progressive video stream.

29. The system of claim 28, wherein the means for merging two fields from the input interlaced video stream to form a frame of the output progressive video stream, comprises means for merging a current field with a late field, wherein the late field follows the current field in the interlaced video stream.

30. The system of claim 28, wherein the means for merging two fields from the input interlaced video stream to form a frame of the output progressive video stream, comprises means for merging a current field with an early field, wherein the current field follows the early field in the interlaced video stream.

31. The system of claim 27, wherein the means for classifying the input interlaced video stream based on detection of the selected special pattern comprises:
means for classifying the input interlaced video stream as special mode when the enter special mode counter equals a special mode threshold.

32. The system of claim 31, wherein the means for classifying the input interlaced video stream based on detection of the selected special pattern comprises:
means for incrementing an exit special mode counter when the selected special pattern is not detected;

means for classifying the input interlaced video stream as normal mode when the exit special mode counter equals an exit special mode threshold.

33. The system of claim 27, wherein the means for detecting a selected special pattern in the plurality of field to field differences comprises means for determining whether a first field to field difference of the plurality of field to field differences is smaller than each member of a first subset of the plurality of field to field differences.

34. The system of claim 33, wherein the means for detecting a selected special pattern in the plurality of field to field differences further comprises means for determining whether a second field to field difference of the plurality of field to field differences is smaller than each member of a second subset of the plurality of field to field differences.

35. The system of claim 27, wherein the means for detecting a selected special pattern in the plurality of field to field differences further comprises:
    means for detecting a partial special pattern in the plurality of field to field differences, wherein the partial special pattern is a subset of the selected special pattern; and
    means for determining whether additional field to field differences match a remaining special pattern; wherein the remaining special pattern is a subset of the selected special pattern.

36. The system of claim 27, wherein the means for calculating a plurality of field to field differences comprises:
    means for calculating an absolute difference between each pixel of a subset of pixels of a first field with a corresponding pixel of a second field to form a plurality of absolute differences for the first field;
    means for summing each absolute difference to generate a field to field difference for the first field.

37. The system of claim 27, wherein the means for calculating a plurality of field to field differences comprises:
    means for calculating an absolute difference between each pixel of a subset of pixels of a first field with a corresponding pixel of a second field to form a plurality of absolute differences for the first field;
    means for comparing each absolute difference with a difference threshold;
    means for summing each absolute difference greater than the difference threshold to generate a field to field difference for the first field.

38. The system of claim 27, wherein the means for calculating a plurality of field to field differences comprises:
    means for calculating an absolute difference between each pixel of a subset of pixels of a first field with a corresponding pixel of a second field to form a plurality of absolute differences for the first field;
    means for comparing each absolute difference with a difference threshold; means for incrementing a field to field difference for the first field by one for each absolute difference greater than the difference threshold.

39. A method of deinterlacing an input interlaced video stream having a plurality of fields to form an output progressive video stream having a plurality of frames, the method comprising:
    calculating a plurality of field to field differences;
    detecting a selected special pattern in the plurality of field to field differences by determining whether a first field to field difference of the plurality of field to field differences is smaller than each member of a first subset of the plurality of field to field differences;
    classifying the input interlaced video stream based on detection of the selected special pattern;
    performing special mode deinterlacing when the input interlaced video stream is classified as a special mode video stream; and
    performing normal mode deinterlacing when the input interlaced video stream is classified as normal mode video stream.

40. The method of claim 39, wherein the detecting a selected special pattern in the plurality of field to field differences further comprises determining whether a second field to field difference of the plurality of field to field differences is smaller than each member of a second subset of the plurality of field to field differences.

41. A method of deinterlacing an input interlaced video stream having a plurality of fields to form an output progressive video stream having a plurality of frames, the method comprising:
    calculating a plurality of field to field differences; detecting a selected special pattern in the plurality of field to field differences by
        detecting a partial special pattern in the plurality of field to field differences, wherein the partial special pattern is a subset of the selected special pattern; and
        determining whether additional field to field differences match a remaining special pattern; wherein the remaining special pattern is a subset of the selected special pattern;
    classifying the input interlaced video stream based on detection of the selected special pattern;
    performing special mode deinterlacing when the input interlaced video stream is classified as a special mode video stream; and
    performing normal mode deinterlacing when the input interlaced video stream is classified as normal mode video stream.

42. A system for deinterlacing an input interlaced video stream having a plurality of fields to form an output progressive video stream having a plurality of frames, the system comprising:
    means for calculating a plurality of field to field differences;
    means for detecting a selected special pattern in the plurality of field to field differences comprising means for determining whether a first field to field difference of the plurality of field to field differences is smaller than each member of a first subset of the plurality of field to field differences;
    means for classifying the input interlaced video stream based on detection of the selected special pattern;
    means for performing special mode deinterlacing when the input interlaced video stream is classified as a special mode video stream; and
    means for performing normal mode deinterlacing when the input interlaced video stream is classified as normal mode video stream.

43. The system of claim 42, wherein the means for detecting a selected special pattern in the plurality of field to field differences further comprises means for determining whether a second field to field difference of the plurality of field to field differences is smaller than each member of a second subset of the plurality of field to field differences.

44. A system for deinterlacing an input interlaced video stream having a plurality of fields to form an output progressive video stream having a plurality of frames, the system comprising:

means for calculating a plurality of field to field differences;

means for detecting a selected special pattern in the plurality of field to field differences comprising:

means for detecting a partial special pattern in the plurality of field to field differences, wherein the partial special pattern is a subset of the selected special pattern; and means for determining whether additional field to field differences match a remaining special pattern; wherein the remaining special pattern is a subset of the selected special pattern;

means for classifying the input interlaced video stream based on detection of the selected special pattern;

means for performing special mode deinterlacing when the input interlaced video stream is classified as a special mode video stream; and means for performing normal mode deinterlacing when the input interlaced video stream is classified as normal mode video stream.

* * * * *